June 16, 1936.  H. D. GEYER  2,044,385

RESILIENT MOUNT FOR ELECTRIC MOTORS

Filed Jan. 17, 1935

INVENTOR
Harvey D. Geyer
BY
Spencer Hardman & Fehr
HIS ATTORNEYS

Patented June 16, 1936

2,044,385

UNITED STATES PATENT OFFICE 2,044,385

RESILIENT MOUNT FOR ELECTRIC MOTORS

Harvey D. Geyer, Dayton, Ohio, assignor to General Motors Corporation, Detroit, Mich., a corporation of Delaware Application January 17, 1935, Serial No. 2,167

3 Claims. (Cl. 248—26)

This invention relates to resilient mounts for electric motors or other devices subject to vibration.

Various forms of resilient mounts for supporting the opposed ends of electric motors are now well known.

The object of this invention is to provide an improved form of unitary resilient mount which can be very quickly, simply, and efficiently assembled upon the supported and supporting members, which can be very economically manufactured since the tolerance limits of the main dimensions are relatively large, and which is highly efficient in use in dampening vibrations set up in the electric motor or other supported device.

Further objects and advantages of the present invention will be apparent from the following description, reference being had to the accompanying drawing, wherein a preferred embodiment of the present invention is clearly shown.

In the drawing:

Fig. 2 is an elevation of the detached mount looking in the direction of arrow 2 in Fig. 1.

Fig. 3 is a top view of Fig. 2.

Fig. 4 is a bottom view of Fig. 2.

Fig. 5 is an end view looking in direction of arrow 5 of Fig. 2.

Similar reference characters refer to similar parts throughout the several views.

Figure 1:
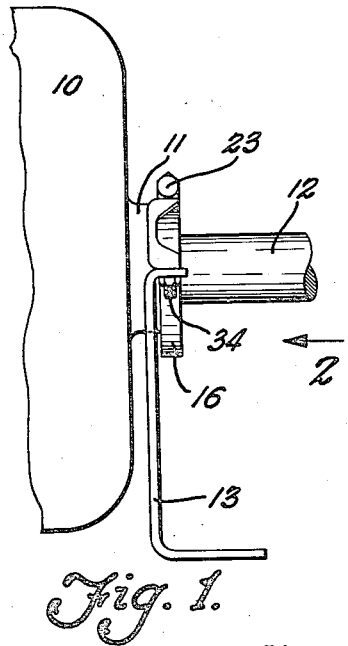
Fig. 1 is a side elevation showing one end of a small electric motor mounted by means of the resilient mount of this invention.
Figure 3:
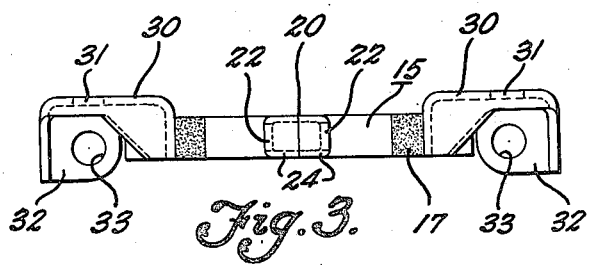
Figs. 2 to 5 are detail views of the resilient mount.
Figure 2:
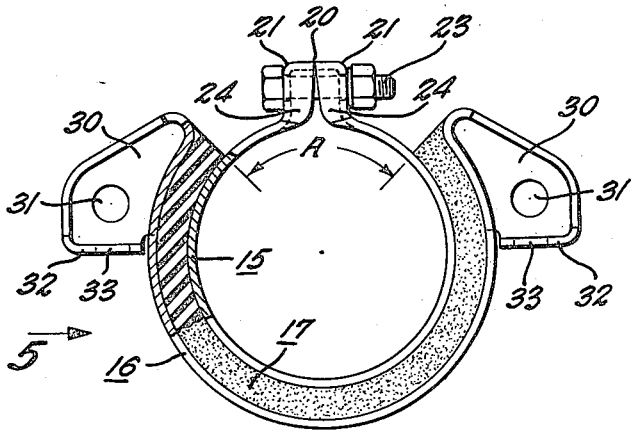
Figure 5:
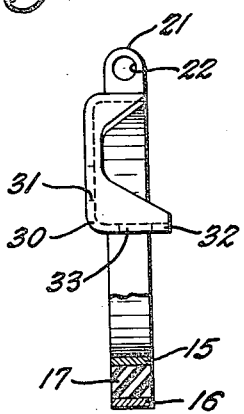
Figure 4:
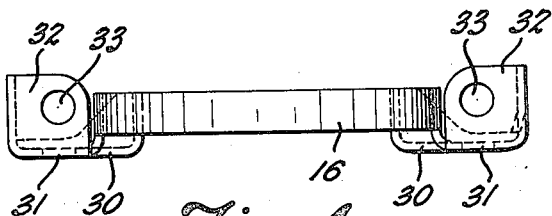

The electric motor 10 is shown as having a stationary projection 11 thereon which is concentric with and supports the bearing for the armature shaft 12, such as is ordinarily found on present day fractional horse power motors.

The unitary detachable mounting unit of this invention comprises three parts, namely, an inner metal ring 15 which is clamped upon the motor projection 11, an outer metal partial ring 16 which is bolted to the stationary motor support 13, and a resilient rubber ring segment 17 which is vulcanized in situ between the inner and outer members 15 and 16. The inner metal ring 15 is a split ring, being split at 20, and has two opposed radially outwardly projecting lugs 21 having holes 22 therein through which a clamping bolt 23 may be easily inserted to clamp this ring 15 tightly upon the motor projection 11. Ring 15 is shown as being made as a metal stamping with the metal lugs 21 being stiffened by their integral metal flanges 24.

The outer metal partial ring 16 (or ring segment as it will be hereinafter termed) is also shown made as a metal stamping. The end portions of the segment 16 are bent outwardly and formed into the flanged attachment lugs 30 as clearly illustrated in the drawing. These lugs 30 are suitably apertured at 31 for horizontally disposed attachment bolts if such are desired in any mounting arrangement, and also lugs 30 have horizontal flanges 32 with holes 33 for the vertically disposed attachment bolts 34 for the mounting arrangement shown in Fig. 1.

The resilient rubber ring segment 17 is vulcanized in situ to the metal members 15 and 16 by properly locating members 15 and 16 as inserts within the vulcanizing mold. The outer metal segment 16 and the rubber segment 17 do not entirely encircle the inner ring 15 but leave an uncovered arc "A" on ring 15 adjacent the clamping lugs 21 of sufficient length to permit the entire mount assembly to be readily expanded or contracted by flexing same. This greatly facilitates the endwise sliding of the mount over the end of projection 11 on the motor 10 and the clamping of the mount rigidly thereupon by tightening up of the clamping bolt 23.

It will also be noted that, since the entire resilient mount is yieldable in diameter while it is being attached to the motor 10 and support bracket 13, no great accuracy of diametral dimensions of rings 15 and 16 is necessary and hence the metal members 15 and 16 can be economically and rapidly made as pressed metal stampings, no machining of these parts being required for accuracy.

It will also be noted that the over-all axial depth of the entire mount is only approximately that of the resilient rubber segment 17 (see Fig. 1) and hence this mount can be used where there is a minimum of axial space available for its location on the motor. This axial depth is kept to a minimum by providing that the clamping bolt 23 for the inner expansible ring 15 is located substantially on the center line of the rubber segment 17, in other words, no laterally off-set clamping flange and lugs on the inner ring 15 are necessary. The uncovered arc "A" of this inner ring 15 readily permits the proper insertion and tightening up of the clamping bolt 23.

Another feature of this resilient mount is the easy adjustability of the relative positions of the motor 10 to the support bracket 13. For instance, Fig. 1 shows bracket 13 extending upwardly from a bottom base. If however it is desired to support the motor from a vertical wall or a ceiling wall, it is necessary merely to loosen clamping bolt 23 and then rotate the bracket 13 fixed to the resilient mount to the desired relative angular position and again tighten clamping bolt 23. This will maintain the motor 10 in its normal upright position in a very simple manner.

It is to be understood, of course, that each end of the motor is provided with a resilient mount. These mounts will permit a desired limited deflection of the motor in an endwise or in any radial direction, and will provide a quite easy rotative deflection of the motor to absorb shocks caused by starting, stopping, or suddenly increasing or decreasing the load thereon. The ease of rotative deflection is materially enhanced by omitting the rubber 17 over the arc "A".

While the embodiment of the present invention as herein disclosed, constitutes a preferred form, it is to be understood that other forms might be adopted, all coming within the scope of the claims which follow.

What is claimed is as follows:

1. A unitary resilient mount adapted to be used as an end mounting for an electric motor, comprising: an inner metal split ring having clamping projections thereon whereby it may be clamped tightly upon an interior supported member, an outer metal ring segment spaced from and surrounding approximately three fourths of said inner ring but leaving a substantial clearance adjacent said clamping projections thereon, and a resilient rubber ring segment interposed between and vulcanized to both said inner ring and outer ring segment, said outer ring segment having means for rigidly fixing same to a support.

2. A unitary resilient mount adapted to be used as an end mounting for an electric motor, comprising: an inner metal split ring having clamping projections thereon whereby it may be clamped tightly upon an interior supported member, an outer metal ring segment spaced from and encasing said inner ring except adjacent said clamping projections thereon, and a resilient rubber ring segment interposed between and vulcanized to said inner metal ring and outer metal ring segment and substantially clearing said clamping projections, said outer ring segment having its end portions turned outwardly from said clamping projections and forming attachment brackets whereby it may be fixed to a suitable support.

3. A unitary resilient mount adapted to be used as an end mounting for an electric motor, comprising: an inner metal split ring having radially extending clamping projections whereby it may be rigidly clamped upon an interior supported member, a resilient rubber segment surrounding and bonded to said split ring but leaving a substantial clearance adjacent said clamping projections, and a stamped metal outer ring segment encasing and bonded to said rubber segment and having its end portions bent outwardly away from said clamping projections and forming two spaced attachment lugs whereby it may be fixed to a suitable support.

HARVEY D. GEYER.